United States Patent
Lin

(10) Patent No.: US 7,372,782 B2
(45) Date of Patent: May 13, 2008

(54) DISC DETECTING METHOD IN A MULTI-DISC OPTICAL STORAGE APPARATUS

(75) Inventor: Jui Chiang Lin, Hsinchu (TW)

(73) Assignee: Lite-On It Corporation, Taipei (TW)

( * ) Notice: Subject to any disclaimer, the term of this patent is extended or adjusted under 35 U.S.C. 154(b) by 716 days.

(21) Appl. No.: 10/994,356

(22) Filed: Nov. 23, 2004

(65) Prior Publication Data

US 2006/0018217 A1    Jan. 26, 2006

(30) Foreign Application Priority Data

Jul. 22, 2004    (TW)    .............................. 93121894 A

(51) Int. Cl.
*G11B 17/22*    (2006.01)

(52) U.S. Cl. ................ 369/30.03; 369/30.88; 369/30.92

(58) Field of Classification Search ............... 369/47.1, 369/30.36, 30.01, 53.1, 30.92, 30.03, 30.88, 369/30.93, 31.01, 30.77, 30.85, 30.6, 30.81, 369/30.78; 720/634, 623, 645

See application file for complete search history.

(56) References Cited

U.S. PATENT DOCUMENTS 6,717,890 B2 *    4/2004    Lee .......................... 369/30.03

* cited by examiner

*Primary Examiner*—Ali Neyzari
(74) *Attorney, Agent, or Firm*—Troxell Law Office, PLLC

(57) ABSTRACT

The present invention relates to a disc detecting method in a multi-disc optical storage apparatus, which comprises receiving an electronic signal and determining whether to perform a complete disc detecting process or not when the multi-disc optical storage apparatus is turned on or a multi-disc magazine is inserted into the multi-disc optical storage apparatus. If the multi-disc optical storage apparatus decides not to perform the complete disc detecting process, the multi-disc optical storage apparatus can enter to be standby to wait for further commands from users. If the multi-disc optical storage apparatus decides to perform the complete disc detecting process, the detecting result will be then stored in a memory for providing a reference to the subsequent accessing.

12 Claims, 3 Drawing Sheets

DISC DETECTING METHOD IN A MULTI-DISC OPTICAL STORAGE APPARATUS

This Non-provisional application claims priority under 35 U.S.C. § 119(a) on Patent Application No(s). 093121894 filed in Taiwan, Republic of China on Jul. 22, 2004, the entire contents of which are thereby incorporated by reference.

FIELD OF THE INVENTION

The present invention relates to a disc detecting method in a multi-disc optical storage apparatus, particular to a disc detecting method for determining whether to perform a complete disc detecting process or not when the multi-disc optical storage apparatus is turned on or a multi-disc magazine is inserted into the multi-disc optical storage apparatus.

BACKGROUND OF THE INVENTION

Optical disc has advantages of a large storage capability, easily preservation and maintenance, a long shelf period, low cost, and excellent data protection. It is increasingly used to substitute for conventional magnetic storage medium and thus becomes a popular optical storage medium for people not only in business but also in daily life. In general, various disc loading mechanisms for optical storage apparatus have been developed such as a single-disc tray and a multi-disc magazine. Regarding the multi-disc optical storage apparatus, it is necessary to use a multi-disc magazine for allowing an optical pickup unit to select-and read the disc appointed by user. Such multi-disc magazine is also found in some home video and audio equipments. Since such multi-disc magazine can carry plural of discs at one time, it can play and read discs sequentially for a long period without replacing new ones. Thus such multi-disc magazine design has also found in car-use audio equipment for drivers to enjoy their favorite music.

As above-mentioned, such a multi-disc optical storage apparatus capable of carrying plural of discs at one time generally equips with a multi-disc magazine to accommodate the discs. In the multi-disc magazine, there are plural of trays for holding each disc. However, according to a user's habit, not all trays of the magazine carry discs. Generally, the conventional multi-disc optical storage apparatus will first perform a complete disc detecting process while it is turned on. FIG. 1 shows a flow chart for a disc detecting process found in current multi-disc optical storage apparatus. As shown in FIG. 1, when a multi-disc optical storage apparatus is turned on or a multi-disc magazine is inserted in the apparatus (e.g. Step S110), the multi-disc optical storage apparatus performs a complete disc detecting process (e.g. Step S112), then the multi-disc optical storage apparatus is standby to perform the next action requested by user (e.g. Step S114). In current multi-disc optical storage apparatus, it detects the disc-carrying status in the multi-disc magazine through the complete disc detecting process and records the detected result in the memory of the storage apparatus for providing a reference to subsequently access the discs carried in the magazine.

FIG. 2 shows a flow chart for a complete disc detecting process found in current multi-disc optical storage apparatus. As shown in FIG. 2, the apparatus starts the complete disc detecting process (e.g. Step S210) to select a tray which has not yet been detected (e.g. Step S212) and then detect whether the detected tray has carried a disc (e.g. Step S214). If the detected tray carries a disc, the process is going to the Step S216 to read the information on the disc and then going to the Step S218 to determine whether all trays have already been detected. In Step S214, if the detected tray does not carry a disc, the process is going to the Step S218 to determine whether all trays have already been detected. In Step S218, if it determines that all trays have already been detected, the process is going to the Step S220 to show that the disc detecting process is completed. If it determines that not all trays have been detected, the process returns to the Step S212 to continue detecting the remaining tray which has not yet been detected. Thereby, the multi-disc optical storage apparatus will automatically omit the disc reading procedure on the tray if that carries no disc during the subsequent playing. Therefore, the time either for repetitive accessing or detecting empty tray is saved.

However, since the complete disc detecting process performs when the multi-disc optical storage apparatus is turned on or the multi-disc magazine is inserted in the apparatus, user should take time to wait for the completion of the disc detecting process. If all trays in the magazine have carried disc, it seems not necessary to perform such a complete disc detecting process to detect whether each tray has already carried a disc. In this regard, the complete disc detecting time is wasted for a user when the multi-disc optical storage apparatus is turned on or the multi-disc magazine is inserted in the apparatus.

SUMMARY OF THE INVENTION

The present invention relates to a disc detecting method for a multi-disc optical storage apparatus, which comprises receiving an electronic signal and determining whether to perform a complete disc detecting process or not when the multi-disc optical storage apparatus is turned on or a multi-disc magazine is inserted into the multi-disc optical storage apparatus. If the multi-disc optical storage apparatus decides not to perform the complete disc detecting process, the multi-disc optical storage apparatus can enter a standby state to wait for further commands from users. If the multi-disc optical storage apparatus decides to perform the complete disc detecting process, for example, to detect each tray in the magazine, the detecting result will be then stored in a memory of the apparatus for providing a reference to the subsequent accessing.

The present invention further relates to a disc detecting method for a multi-disc optical storage apparatus, in which the multi-disc optical storage apparatus comprises a multi-disc magazine and the magazine comprises plural of trays for carrying disc. The method comprises the steps of: receiving an electronic signal and determining whether to perform a complete disc detecting process or not when the multi-disc optical storage apparatus is turned on or a multi-disc magazine is inserted into the multi-disc optical storage apparatus; and deciding to perform a complete disc detecting process if the electronic signal is in the first state, or deciding not to perform the complete disc detecting process if the electronic signal is in the second state, wherein the complete disc detecting process comprises detecting each tray in the magazine.

According to the disc detecting method for a multi-disc optical storage apparatus of the present invention, the electronic signal is controlled by a switch device. If the number of discs carried in the magazine is less than a threshold, the switch device is adjusted to allow the electronic signal being in the first state. Otherwise, the switch device is adjusted to allow the electronic signal being in the second state. The switch device can be a pressing key provided on a control panel or a toggle switch provided in the multi-disc magazine.

According to the disc detecting method for a multi-disc optical storage apparatus of the present invention, it decides not to perform the complete disc detecting process if each tray in the multi-disc magazine carries a disc, and then enters into a standby state to wait readily for further commands from users, such as start to play music on the disc without wasting time to detect each tray in the magazine. Therefore a waiting time is saved when the apparatus is turned on or the magazine is inserted into the apparatus.

BRIEF DESCRIPTION OF THE DRAWINGS

The present invention is illustrated more detail by reference to the accompanying drawings, wherein.

DETAILED DESCRIPTION OF THE INVENTION

Figure 3:
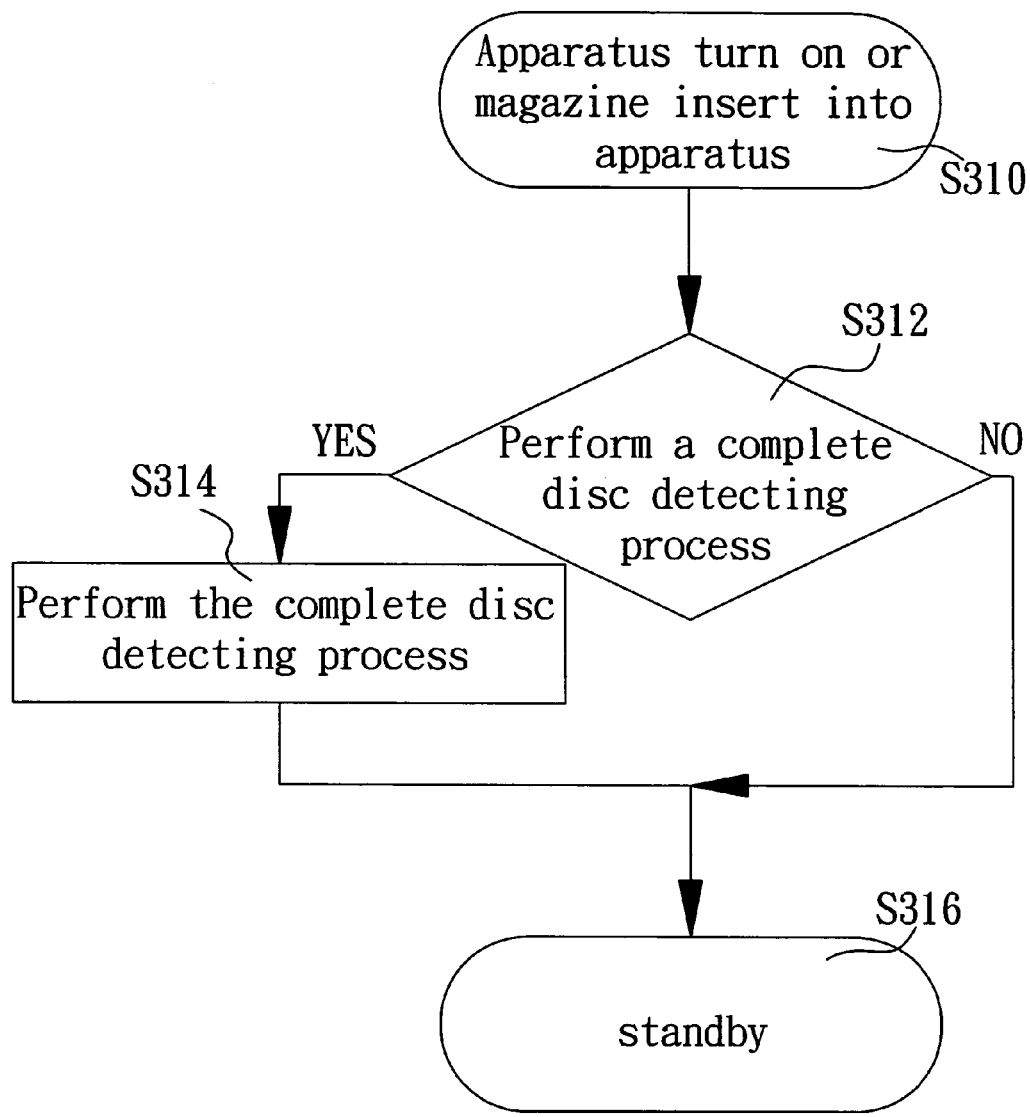
FIG. 3 shows a flow chart for a disc detecting method in a multi-disc optical storage apparatus according to one preferred embodiment of the present invention.

Now refer to FIG. 3. FIG. 3 shows a flow chart for a disc detecting method in a multi-disc optical storage apparatus according to one preferred embodiment of the present invention. As shown in FIG. 3, the multi-disc optical storage apparatus is turned on or a multi-disc magazine is inserted into the multi-disc optical storage apparatus (Step S310), the multi-disc optical storage apparatus receives an electronic signal to decide whether a complete disc detecting process is performed (Step S312). If the electronic signal is in a first state, for example, at a high voltage level, the apparatus proceeds to Step S314 to perform a complete disc detecting process by detecting each tray in the magazine, and then go to Step S316 to be standby for further commands from user. The apparatus decides not to perform a complete disc detecting process if the electronic signal is in a second state, for example, at a low voltage level, then go to Step S316 directly to be standby for further commands from user. The electronic signal is adjusted based on the setting data stored in the memory of the apparatus. Alternatively, the electronic signal is adjusted by a switch device. Generally speaking, the switch is set to have the electronic signal in the first state if the number of discs carried in the magazine is less than a threshold, and the switch is set to have the electronic signal in the second state if the number of discs carried in the magazine is not less than the threshold.

For example, the switch device can be a pressing key provided on a control panel of the apparatus or be a toggle switch provided in the multi-disc magazine. Also, the state of the electronic signal can be shown by a displaying element, for example, a light displaying element provided on a front panel of the apparatus. Moreover, the above threshold could, for example, be corresponding to a ratio of the number of discs in the magazine to the total number of trays in the magazine. In this regard, the ratio could be set at a value equal to or more than 2/3, preferably equal to or more than 4/5. For example, for a 10-disc magazine, the ratio could be set at a value of 8/10, and the threshold value is 8. Therefore, for example, when 8, 9, or 10 discs are loaded in the 10-disc magazine, which is fully loaded or almost fully loaded, the electronic signal is adjusted through a switch device to be the second state, and the apparatus will not perform the complete disc detecting process. Thus, the multi-disc optical storage apparatus is starting to play or read the disc in time when the storage apparatus is turned on or the magazine is inserted into the apparatus. Therefore, the time waiting for detecting disc is saved.

Figure 1:
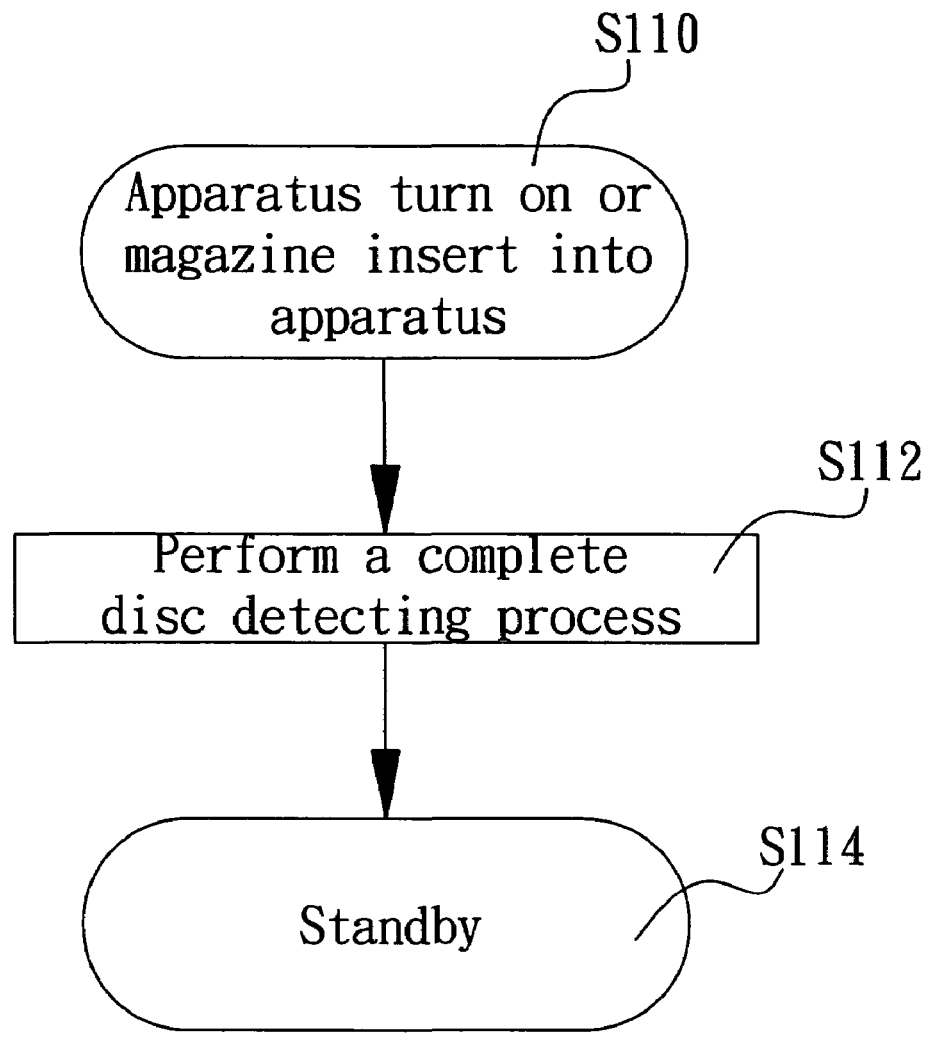
FIG. 1 shows a flow chart for a disc detecting process in conventional multi-disc optical storage apparatus.
Figure 2:
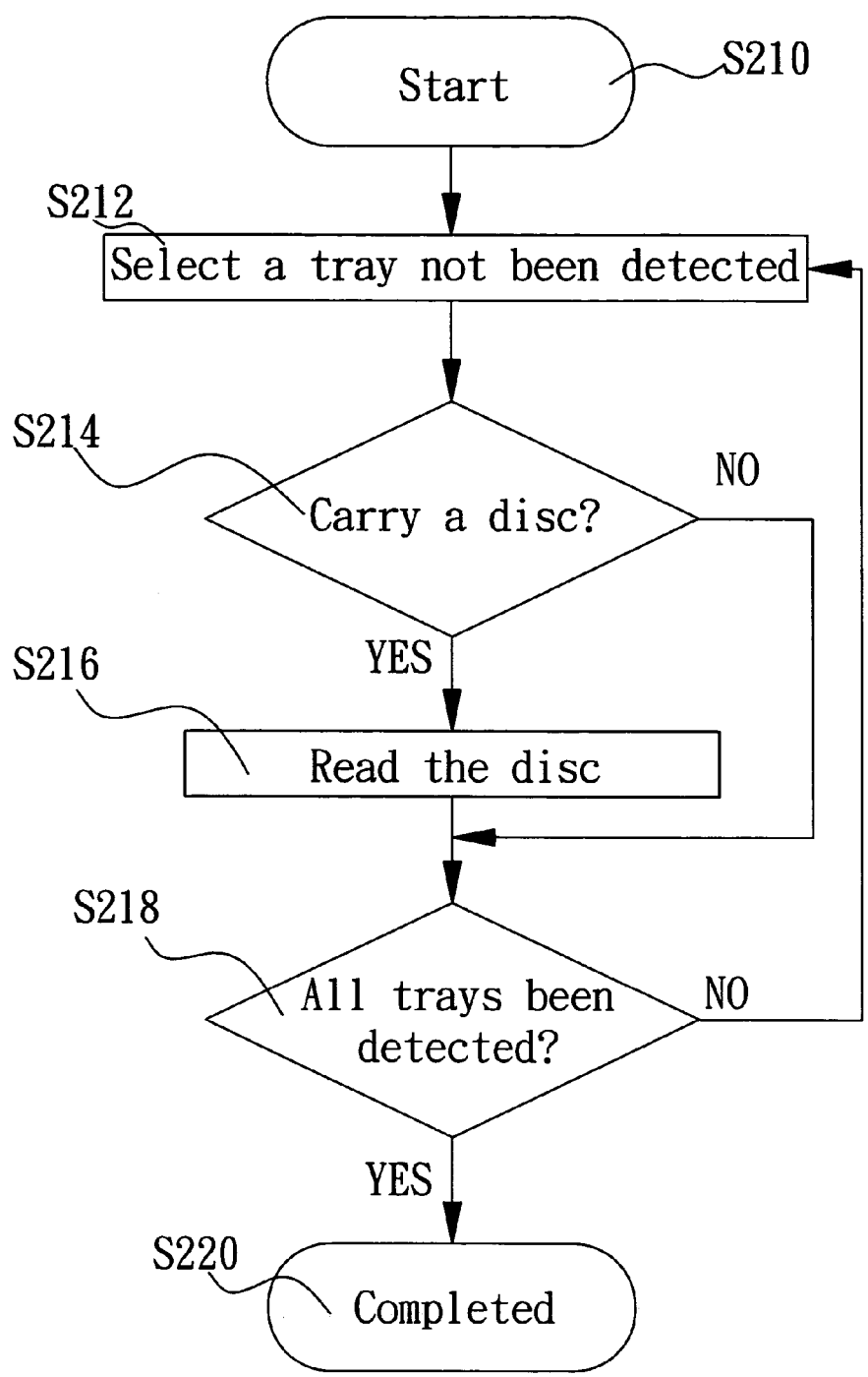
FIG. 2 shows a flow chart for a complete disc detecting process in conventional multi-disc optical storage apparatus.

In Step S312 if it determines to perform the complete disc detecting process, then go to Step S314 to perform the process as shown in FIG. 2. That is to detect each tray to determine whether each tray has carried a disc and further to read the information on the disc if possible. Such discs can be a data optical disc, a video optical disc, and an audio optical disc, and the like. The disc detecting result or the disc reading result or the both can then be stored in the memory provided in the storage apparatus. Therefore, in subsequent accessing process, the apparatus can select the desired tray with a desired disc rapidly and accurately and read the disc contained therein. When the Step S314 is completed, go to Step S316 to allow the storage apparatus being standby for further commands from users. In this time, since the disc-carrying status of the magazine has been stored in the memory, the storage apparatus would omit the empty tray so that unnecessary time of disc motion in/out is saved.

In Step S312, if it determines not to perform the complete disc detecting process, then go to Step S316 directly to allow the storage apparatus being standby for further commands from users. In this time, although the memory lacks the information about the disc-carrying status in the magazine, the apparatus would presume that all trays have carried discs. After being at standby, the apparatus detects the tray selected by the user and determines whether the tray carries a disc or whether the playing is started. Therefore, the storage apparatus can directly be standby for next commend from user such as driving and playing the disc when the storage apparatus is turned on or the magazine is inserted into the apparatus. Since the magazine is fully loaded or almost fully loaded, only a few times of failed trials would happen while accessing discs later. And the unnecessary time for performing a complete disc detecting process is saved.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A disc detecting method in a multi-disc optical storage apparatus, in which the multi-disc optical storage apparatus includes a multi-disc magazine and the magazine includes plural trays for carrying discs, the method comprises the steps of:
    receiving an electronic signal when the multi-disc optical storage apparatus is turned on or a multi-disc magazine is inserted into the multi-disc optical storage apparatus;
    performing a complete disc detecting process when the electronic signal is in a first state; and
    deciding not to perform a complete disc detecting process when the electronic signal is in a second state;
    wherein the complete disc detecting process comprises detecting each tray in the magazine.

2. The method according to claim 1, wherein the complete disc detecting process further comprises the steps of:
    (a) selecting a tray which has not yet been detected;
    (b) detecting whether the selected tray carries a disc; and
    (c) determining whether all trays have been detected; if so, the disc detecting process is completed; if not, returning to the step (a).

3. The method according to claim 2, wherein the step (b) further comprises the step of reading a data on a disc if it detects that the tray carries the disc.

4. The method according to claim 1, wherein the electronic signal is adjusted based on a setting stored in a memory of the multi-disc optical storage apparatus.

5. The method according to claim 1, wherein the electronic signal is controlled by a switch device.

6. The method according to claim 5, wherein the electronic signal is adjusted to the first state when the number of disc carried in the magazine is less than a threshold value; otherwise the electronic signal is adjusted to the second state.

7. The method according to claim 5, wherein the threshold value is corresponding to a ratio of the number of disc carried in the magazine to the number of trays in the magazine.

8. The method according to claim 7, wherein the ratio is 2/3 or 4/5.

9. The method according to claim 5, wherein the switch device is controlled by a pressing key provided on a front panel of the storage apparatus.

10. The method according to claim 5, wherein the switch device is controlled by a toggle switch provided in the magazine.

11. The method according to claim 1, wherein the state of the electronic signal is displayed by a displaying device provided on a front panel of the storage apparatus.

12. The method according to claim 11, wherein the displaying device is a lighting device.

* * * * *